(12) United States Patent
Weijnen et al.

(10) Patent No.: US 9,796,875 B2
(45) Date of Patent: Oct. 24, 2017

(54) COATING COMPOSITION AND USE THEREOF

(75) Inventors: John Weijnen, Alphen aan den Rijn (NL); Joost De Wit, Utrecht (NL)

(73) Assignee: PPG Europe BV, Uithoorn (NL)

( * ) Notice: Subject to any disclaimer, the term of this patent is extended or adjusted under 35 U.S.C. 154(b) by 0 days.

(21) Appl. No.: 14/239,433

(22) PCT Filed: Aug. 17, 2012

(86) PCT No.: PCT/EP2012/066141
§ 371 (c)(1),
(2), (4) Date: Feb. 18, 2014

(87) PCT Pub. No.: WO2013/026804
PCT Pub. Date: Feb. 28, 2013

(65) Prior Publication Data
US 2014/0194571 A1    Jul. 10, 2014

(30) Foreign Application Priority Data
Aug. 19, 2011    (WO) ................. PCT/EP2011/064295

(51) Int. Cl.
| | | |
|---|---|---|
| C09D 175/04 | (2006.01) |
| C08G 18/66 | (2006.01) |
| C08G 18/79 | (2006.01) |
| C09D 175/14 | (2006.01) |
| C08G 18/38 | (2006.01) |
| C08G 18/42 | (2006.01) |
| C08G 18/46 | (2006.01) |
| C09D 161/32 | (2006.01) |
| C09D 167/00 | (2006.01) |
| C09D 167/08 | (2006.01) |

(52) U.S. Cl.
CPC ....... *C09D 175/04* (2013.01); *C08G 18/3821* (2013.01); *C08G 18/4288* (2013.01); *C08G 18/4607* (2013.01); *C08G 18/6651* (2013.01); *C08G 18/792* (2013.01); *C09D 175/14* (2013.01); *C09D 161/32* (2013.01); *C09D 167/00* (2013.01); *C09D 167/08* (2013.01)

(58) Field of Classification Search
CPC .. C09D 167/08; C09D 167/00; C09D 161/32; C09D 175/04
See application file for complete search history.

(56) References Cited

U.S. PATENT DOCUMENTS

| | | | | |
|---|---|---|---|---|
| 4,178,425 A * | 12/1979 | Emmons | ................. | C04B 26/06 |
| | | | | 525/125 |
| 5,126,170 A * | 6/1992 | Zwiener | ............ | C08G 18/3821 |
| | | | | 427/385.5 |
| 5,214,086 A * | 5/1993 | Mormile et al. | .............. | 524/237 |
| 6,316,535 B1* | 11/2001 | Caldwell et al. | ............. | 524/425 |
| 2008/0146748 A1* | 6/2008 | Blum | ................. | C08G 18/0823 |
| | | | | 525/418 |
| 2009/0017215 A1* | 1/2009 | Wu | ........................ | C08F 283/01 |
| | | | | 427/426 |
| 2010/0285311 A1* | 11/2010 | Steidl | ................. | C08G 18/2845 |
| | | | | 428/339 |
| 2012/0025142 A1* | 2/2012 | Visser et al. | ............. | 252/389.61 |
| 2013/0203934 A1* | 8/2013 | Best et al. | .................... | 524/589 |
| 2014/0194571 A1* | 7/2014 | Weijnen | ............ | C08G 18/6651 |
| | | | | 524/778 |

FOREIGN PATENT DOCUMENTS

GB    1300741    *    6/1972

* cited by examiner

*Primary Examiner* — Michael A Salvitti
(74) *Attorney, Agent, or Firm* — Krisanne Shideler

(57) ABSTRACT

The invention relates to a coating composition comprising: a) at least one alkyd binder with an oil content of at least 45 wt % and at most 85 wt %, a modified alkyd binder, or a combination thereof; b) at least one amine or imine component selected from the group comprising: polyaspartic acids and esters thereof, (meth)acrylate/aspartate amines, aldimines, ketimines, and combinations thereof; and c) at least one isocyanate compound.

15 Claims, No Drawings

COATING COMPOSITION AND USE THEREOF

FIELD OF THE INVENTION

The invention relates to a coating composition. In particular the present invention relates to an alkyd-based coating composition, comprising at least on alkyd binder and at least one amine or imine component.

BACKGROUND OF THE INVENTION

Alkyd resins are long-established binder polymers for film-forming coating compositions acknowledged for their esthetic properties, low surface tension (which enables the wetting of and adhesion on a wide variety of substrates and facilitates pigment wetting), applicability by various techniques, and cost-effectiveness. Because of these properties, alkyd resins are the most widely used air drying binders in coating compositions. Alkyd resins comprise drying or semi-drying unsaturated fatty acids or oils, which are generally attached to the polyester backbone of polyols and polycarboxylic acids. When the coating composition is applied to a substrate, the drying process starts by solvent evaporation and the binder polymers undergo autoxidation and subsequently form cross-links between the polymer chains resulting in a solid and coherently dried film. The drying process of autoxidizable architectural coating compositions takes place at ambient temperatures ranging from −10 to 50° C., whereby the presence of oxygen is essential. Generally, the drying process proceeds slowly.

Amine components such as polyaspartic acids have first been introduced in the early 1990s. This technology was initially used in conventional 2K polyurethane resins as reactive diluents to reduce the VOC-content. The chemistry of polyaspartic coatings is based on a reaction of a polyisocyanate with a polyaspartate. Polyfunctional amine components have been used as coreactants for isocyanates in many applications. Their use in coatings, however, has been limited due to their very high reactivity. Typical primary and secondary amine based systems are characterized by very short gel times, resulting in a short or no pot life and aesthetically deprived films, due to restricted flow and leveling. Polyaspartic esters exhibit a reduced reactivity towards polyisocyanate compounds compared to typical primary and secondary polyamines. The unique structural feature of the polyaspartic ester is a sterically crowded environment around the nitrogen. Additionally, the ester portion of the structure provides inductive effects. These features both act to slow down the reaction of the amino group of the polyaspartic ester compound and the isocyanate group of a polyisocyanate.

However, because of the low intrinsic viscosity of polyaspartics and the poor response to thickening agents, the difficulty to matt, the high cross linking density which makes the film hard and less flexible for non-dimensional stable substrates, the incompatibly to alkyd colorants and the high price, there exists a need to improve the performance of coating compositions that comprise polyaspartic resins. It is accordingly one of the objects of the present invention to overcome or ameliorate at least one of the disadvantages of the prior art.

SUMMARY OF THE INVENTION

The present inventors have now found that these objects can be obtained by using a combination of at least one alkyd binder with an oil content of at least 45 wt % and at most 85 wt %, for example comprising a medium oil alkyd binder, a long oil alkyd binder, or a very long oil alkyd binder; a modified alkyd binder; or a combination thereof; with at least one amine or imine component selected from the group comprising polyaspartic acids and esters thereof, (meth)acrylate/aspartate amines, aldimines, ketimines, and combinations thereof; and with at least one isocyanate compound.

The inventors have surprisingly found that coating compositions as presently claimed improve the drying speed, and yet maintain the benefits of alkyds, such as colorant compatibility, rheology, price and ease of application. On the other hand compared to polyaspartic—isocyanate systems, the flexibility of the product may be improved and the pot life may be extended. A practical application of this invention is the speeding up of the drying of the alkyd-based coating composition of the invention in case of an imminent rain shower or in a dual feed spray equipment.

According to a first aspect, the present invention concerns a coating composition comprising:
a) at least one alkyd binder with an oil content of at least 45 wt % and at most 85 wt %, a modified alkyd binder, or a combination thereof;
b) at least one amine or imine component selected from the group comprising polyaspartic acids and esters thereof, (meth)acrylate/aspartate amines, aldimines, ketimines, and combinations thereof; and
c) at least one isocyanate compound.

In an embodiment, the present invention concerns a coating composition comprising:
a) at least one alkyd binder comprising a medium oil alkyd binder, a long oil alkyd binder, a very long oil alkyd binder, a modified alkyd binder, or a combination thereof;
b) at least one amine or imine component selected from the group comprising polyaspartic acids and esters thereof, (meth)acrylate/aspartate amines, aldimines, ketimines, and combinations thereof; and
c) at least one isocyanate compound.

Preferably, the alkyd binder comprises a urethane modified alkyd binder.

According to a second aspect, the present invention also encompasses the use of the coating composition according to the first aspect of the present invention in a varnish, lacquer, paint, stain, varnishes, enamels, printing ink or floor covering, preferably as a two-component (2K) system.

In a third aspect, the present invention also encompasses a substrate having applied thereon a coating composition according to the first aspect of the present invention.

The present inventors surprisingly found that blending polyaspartics or esters thereof, (meth)acrylate/aspartate amines, aldimines or ketimines with alkyd binders provides a composition which displays about the same drying speed as pure polyaspartics but with all the benefits of alkyds (colorant compatibility, rheology, price and ease of application). Moreover, the flexibility of the coating is improved and the pot life of the composition comprising the alkyd and the polyaspartic acid is extended.

In addition, according to a preferred embodiment, the coating compositions of the invention have a high solid content and a low VOC content. Since intermolecular hydrogen bonds substantially augment the intrinsic viscosity of an alkyd binder, a common approach to synthesize a high solids binder is to minimize the carboxyl and hydroxyl functionality. While high solid alkyd binders have less OH-functionality and are less suitable for additional curing by isocyanate compounds, the present inventors have shown that the low OH-functionality of the alkyd binder was not an issue for the composition of the invention and that the curing was excellent.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF THE INVENTION

When describing the compositions of the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise. By way of example, "a binder" means one binder or more than one binder.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

As used herein, the term "alkyl" by itself or as part of another substituent, refers to a straight or branched saturated hydrocarbon group joined by single carbon-carbon bonds having 1 or more carbon atom, for example 1 to 12 carbon atoms, for example 1 to 6 carbon atoms, for example 1 to 4 carbon atoms. When a subscript is used herein following a carbon atom, the subscript refers to the number of carbon atoms that the named group may contain. Thus, for example, $C_{1-12}$alkyl means an alkyl of 1 to 12 carbon atoms. Examples of alkyl groups are methyl, ethyl, propyl, isopropyl, butyl, isobutyl, sec-butyl, tert-butyl, pentyl and its chain isomers, hexyl and its chain isomers, heptyl and its chain isomers, octyl and its chain isomers, nonyl and its chain isomers, decyl and its chain isomers, undecyl and its chain isomers, dodecyl and its chain isomers.

As used herein, the term "$C_{3-6}$cycloalkyl", by itself or as part of another substituent, refers to a saturated or partially saturated cyclic alkyl radical containing from about 3 to about 6 carbon atoms. Examples of $C_{3-6}$cycloalkyl include cyclopropyl, cyclobutyl, cyclopentyl, or cyclohexyl.

As used herein, the term "$C_{6-10}$aryl", by itself or as part of another substituent, refers to phenyl, naphthyl, indanyl, or 1,2,3,4-tetrahydro-naphthyl.

As used herein, the term "$C_{6-10}$aryl$C_{1-6}$alkyl", by itself or as part of another substituent, refers to a $C_{1-6}$alkyl group as defined herein, wherein a hydrogen atom is replaced by a $C_{6-10}$aryl as defined herein. Examples of $C_{6-10}$aryl$C_{1-6}$alkyl radicals include benzyl, phenethyl, dibenzylmethyl, methylphenylmethyl, 3-(2-naphthyl)-butyl, and the like.

As used herein, the term "$C_{1-12}$alkylene", by itself or as part of another substituent, refers to $C_{1-12}$alkyl groups that are divalent, i.e., with two single bonds for attachment to two other groups. Alkylene groups may be linear or branched and may be substituted as indicated herein. Non-limiting examples of alkylene groups include methylene (—$CH_2$—), ethylene (—$CH_2$—$CH_2$—), methylmethylene (—CH($CH_3$)—), 1-methyl-ethylene (—CH($CH_3$)—$CH_2$—), n-propylene (—$CH_2$—$CH_2$—$CH_2$—), 2-methylpropylene (—$CH_2$—CH($CH_3$)—$CH_2$—), 3-methylpropylene (—$CH_2$—$CH_2$—CH($CH_3$)—), n-butylene (—$CH_2$—$CH_2$—$CH_2$—$CH_2$—), 2-methylbutylene (—$CH_2$—CH($CH_3$)—$CH_2$—$CH_2$—), 4-methylbutylene (—$CH_2$—$CH_2$—$CH_2$—CH($CH_3$)—), pentylene and its chain isomers, hexylene and its chain isomers, heptylene and its chain isomers, octylene and its chain isomers, nonylene and its chain isomers, decylene and its chain isomers, undecylene and its chain isomers, dodecylene and its chain isomers.

As used herein, the term "$C_{3-6}$cycloalkylene", by itself or as part of another substituent refers to a saturated homocyclic hydrocarbyl biradical of formula $C_nH_{2n-2}$. Non-limiting examples of cycloalkylene include 1,2-cyclopropylene, 1,1-cyclopropylene, 1,1-cyclobutylene, 1,2-cyclobutylene, 1,3-cyclopentylene, 1,1-cyclopentylene, or cyclohexylene.

As used herein, the term "$C_{1-12}$alkylene$C_{3-6}$cycloalkylene", by itself or as part of another substituent, refers to a group having the Formula —$R^a$—$R^b$— wherein $R^a$ is $C_{1-12}$alkylene as defined herein and $R^b$ is $C_{3-6}$cycloalkylene as defined herein. A non-limiting example of an $C_{1-6}$alkyl substituted $C_{1-12}$alkylene$C_{3-6}$cycloalkylene is 3,3,5-trimethyl-5-methylene-1-cyclohexyl.

As used herein, the term "$C_{3-6}$cycloalkylene$C_{1-12}$alkylene$C_{3-6}$cycloalkylene", by itself or as part of another substituent, refers to a group having the Formula —$R^b$—$R^a$—$R^b$— wherein $R^a$ is $C_{1-12}$alkylene as defined herein and $R^b$ is $C_{3-6}$cycloalkylene as defined herein. A non-limiting example of a $C_{3-6}$cycloalkylene$C_{1-12}$alkylene$C_{3-6}$cycloalkylene is 4,4'-dicyclohexylene methane. A non-limiting example of a $C_{1-6}$alkyl substituted $C_{3-6}$cycloalkylene $C_{1-12}$alkylene$C_{3-6}$cycloalkylene is 3,3'-dimethyl-4,4'-dicyclohexylene methane.

As used herein, the term "$C_{6-10}$arylene$C_{1-6}$alkylene", by itself or as part of another substituent, refers to a group having the Formula —$R^c$—$R^a$— wherein $R^c$ is $C_{6-10}$arylene as defined herein and $R^a$ is $C_{1-6}$alkylene as defined herein.

According to a first aspect, the present invention concerns a coating composition comprising:
a) at least one alkyd binder with an oil content of at least 45 wt % and at most 85 wt %, a modified alkyd binder, or a combination thereof;
b) at least one amine or imine component selected from the group comprising polyaspartic acids and esters thereof, (meth)acrylate/aspartate amines, aldimines, ketimines, and combinations thereof; and
c) at least one isocyanate compound.

In an embodiment, the present invention concerns a coating composition comprising:
a) at least one alkyd binder comprising a medium oil alkyd binder, a long oil alkyd binder, a very long oil alkyd binder, a modified alkyd binder, or a combination thereof;
b) at least one amine or imine component selected from the group comprising: polyaspartic acids and esters thereof, (meth)acrylate/aspartate amines, aldimines, ketimines, and combinations thereof; and
c) at least one isocyanate compound.

In a preferred embodiment of the invention, the alkyd binder comprises a urethane modified alkyd binder.

As used herein, the terms "alkyd binder" or "alkyd resin" are used interchangeably. Preferably the alkyd binder is an autoxidizable alkyd binder. Suitable autoxidizable alkyd resins for use in the invention are in general the reaction product of the esterification of polyhydric alcohols with polybasic acids (or their anhydrides) and unsaturated fatty acids (or glycerol esters thereof), for example derived from linseed oil, tung oil, tall oil as well as from other drying or semi-drying oils. Alkyd resins are well-known in the art and need not to be further described herein. The properties are primarily determined by the nature and the ratios of the alcohols and acids used and by the degree of condensation. The at least one alkyd binder preferably has an oil content of at least 45 wt % and at most 85 wt %, preferably of at least 60 wt %, preferably of at most 75 wt %. The oil content and fatty acid content is typically weighed out during the synthesis process.

Suitable alkyd resins include long oil, very long oil and medium oil alkyd resins. As used herein, the term "long oil alkyd resin" refers to alkyd resins with an oil content of between 60 and 75 wt %, and a fatty acid content of 57 to 70 wt %. As used herein, the term "medium oil alkyd resin" refers to alkyd resins with an oil content of between 45 wt % and 60 wt %, and a fatty acid content of 42 to 57 wt %. As used herein, the term "very long oil alkyd resin" refers to alkyd resins with an oil content of between 75 and 85 wt %, and a fatty acid content of 70 to 80 wt %.

To improve the performance of the resins, the composition of the alkyd, for example long oil or medium oil alkyd, may be modified. For example, urethane modified alkyds, silicone modified alkyds, styrene modified alkyds, acrylic modified alkyds (e.g. (meth)acrylic modified alkyds), vinylated alkyds, polyamide modified alkyds, and epoxy modified alkyds or mixtures thereof are also suitable alkyd resins to be used in the present composition. According to the invention the alkyd binder comprises at least one medium or long or very long oil alkyd binder, a modified alkyd binder, or a combination thereof. Preferably, the alkyd binder comprises at least one urethane modified alkyd.

The amount of alkyd binder in the present compositions can typically range from about 20 to 98 wt %, such as about 30 to about 90 wt %, preferably about 35 to 70 wt % based on the total weight of the composition. In a preferred embodiment of the present invention, the coating composition comprises at least 25 wt %, preferably at least 40 wt %, more preferably at least 48 wt % of the alkyd binder, with weight percentage being based on the total weight of the composition.

Preferably, said at least one autoxidizable alkyd binder is selected from an unmodified alkyd having an oil content of at least 45 wt % and at most 85 wt %; an urethane modified alkyd; a silicone modified alkyd; or a combination thereof. In a more preferred embodiment of the present invention, the alkyd binder comprises at least one urethane modified alkyd binder and at least one unmodified alkyd binder having an oil content of at least 45 wt % and at most 85 wt %. In a more preferred embodiment of the present invention, the alkyd binder comprises at least one urethane modified alkyd binder and at least one unmodified alkyd binder having an oil content of at least 60 wt % and at most 85 wt %. In a more preferred embodiment of the present invention, the alkyd binder comprises at least one urethane modified alkyd binder and at least one unmodified alkyd binder having an oil content of at least 75 wt % and at most 85 wt %.

Preferably, said at least one autoxidizable alkyd binder is selected from a medium or long or very long oil unmodified alkyd; an urethane modified alkyd; a silicone modified alkyd; or a combination thereof. In a more preferred embodiment of the present invention, the alkyd binder comprises at least one urethane modified alkyd binder and at least one medium or long or very long oil unmodified alkyd binder. In a most preferred embodiment of the present invention, the alkyd binder comprises at least one urethane modified alkyd binder and at least one long oil unmodified alkyd binder.

In an embodiment of the present invention, the coating composition comprises at least 10 wt %, preferably at least 20 wt %, of the at least one alkyd binder with an oil content of at least 45 wt % and at most 85 wt %, with weight percentage being based on the total weight of the composition. In an embodiment of the present invention, the coating composition comprises at least 10 wt %, preferably at least 20 wt %, of the at least one alkyd binder with an oil content of at least 60 wt % and at most 85 wt %, with weight percentage being based on the total weight of the composition. In an embodiment of the present invention, the coating composition comprises at least 10 wt %, preferably at least 20 wt %, of the at least one long oil, very long oil or medium oil unmodified alkyd binder, with weight percentage being based on the total weight of the composition. In an embodiment of the present invention, the coating composition comprises at least 5 wt %, preferably at least 10 wt %, more preferably at least 12 wt % of the at least one urethane modified alkyd binder, with weight percentage being based on the total weight of the composition.

In a preferred embodiment of the present invention, the alkyd binder has a solids content of at least 50%, preferably at least 55%, more preferably at least 60% yet more preferably at least 65%, yet more preferably at least 70%, whereby the solids content is defined as non-volatile solids content or non-volatile matter or nvm. As used herein, the term "solids content" refers to the proportion of non-volatile material contained in an adhesive, coating, ink, paint, or other suspension. It is the material left after the volatile solvent (which serves as a carrier or vehicle for the solid content) has vaporized. The solids content may be determined by evaporating to dryness a weighed sample of solution and determining the percent residue. More details on how the solids content may be measured can be found in ISO3251.

In an embodiment, the at least one alkyd binder or modified binder has an OH content of at most 70 mg KOH/g, as measured by DIN53 240/2. Preferably, the at least one alkyd binder or modified binder has an OH content of at most 60 mg KOH/g, preferably of at most 50 mg KOH/g, preferably of at most 45 mg KOH/g, preferably of at most 40 mg KOH/g, preferably of at most 35 mg KOH/g, preferably of at most 30 mg KOH/g.

According to the first aspect of the invention, the composition comprises at least one amine or imine component selected from the group comprising: polyaspartic acids and esters thereof, (meth)acrylate/aspartate amines, aldimines, ketimines, and combinations thereof. Preferably, the at least one amine or imine component is not a primary amine, i.e. it does not comprise a primary amino group.

Preferably, the composition comprises at least one amine or imine component selected from the group comprising: polyaspartic acids and esters thereof, (meth)acrylate/aspartate amines, aldimines, ketimines, and combinations thereof, with the proviso that said amine is not a primary amine.

In an embodiment, the term "imine" refers to a compound having the formula $R^{100}R^{101}C=NR^{102}$, wherein $R^{100}$ is not hydrogen.

Preferably, the at least one amine or imine component is a secondary amine component or a tertiary amine component or an imine component. Preferably, the at least one amine or imine component is a secondary amine component or an imine component.

As used herein, the term "primary amine" refers to a compound having the formula $R^{100}NH_2$, wherein $R^{100}$ is not hydrogen. As used herein, the term "secondary amine" refers to a compound having the formula $R^{100}R^{101}NH$ wherein $R^{100}$ and $R^{101}$ are not hydrogen. As used herein, the term "tertiary amine" refers to a compound having the formula $R^{100}R^{101}R^{102}N$, wherein none of $R^{100}$, $R^{101}$ and $R^{102}$ is hydrogen.

In an embodiment of the current invention, the coating composition comprises from 0.001 wt % to 25 wt %, preferably from 0.010 wt % to 20 wt %, preferably from 0.1 wt % to 15 wt %, preferably from 1 wt % to 10 wt %, preferably from 1 wt % to 8 wt %, preferably from 1 wt % to 6 wt %, of the at least one amine or imine component, with weight percentage being based on the total weight of the composition.

In an embodiment, the at least one amine or imine component is an amine component selected from polyaspartic acids or esters thereof.

Preferably the at least one amine component is a compound of formula (I), preferably the polyaspartic acid or an ester thereof is a compound of formula (I):

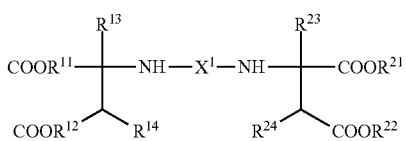

wherein
$X^1$ is a group selected from $C_{2-12}$alkylene, $C_{3-6}$cycloalkylene, $C_{1-12}$alkylene$C_{3-6}$cycloalkylene, or $C_{3-6}$cycloalkylene$C_{1-12}$alkylene$C_{3-6}$cycloalkylene; each group being optionally substituted with one or more $C_{1-6}$alkyl substituents;
$R^{11}$ and $R^{12}$ can be identical or different organic groups which are inert with respect to isocyanate groups under the reaction conditions; preferably $R^{11}$, $R^{12}$, $R^{21}$ and $R^{22}$ are each independently selected from hydrogen or $C_{1-12}$alkyl; and $R^{13}$ and $R^{14}$ can be hydrogen or organic groups which are inert with respect to isocyanate groups under the reaction conditions, preferably $R^{13}$, $R^{14}$, $R^{23}$ and $R^{24}$ are each independently selected from hydrogen or $C_{1-12}$alkyl.

In an embodiment, $X^1$ can be selected from the group comprising 1,4-butylene, 1,6-hexylene, 2,2,4-trimethyl-1,6-hexylene, 2,4,4-trimethyl-1,6-hexylene, 3,3,5-trimethyl-5-methylene-1-cyclohexyl, 4,4'-dicyclohexylene methane, 3,3'-dimethyl-4,4'-dicyclohexylene methane, and 2-methyl-1,5-pentylene, preferably wherein $X^1$ is selected from the group comprising 2-methyl-1,5-pentylene, 4,4'-dicyclohexylene methane, or 3,3'-dimethyl-4,4'-dicyclohexylene methane.

In an embodiment, $R^{11}$, $R^{12}$, $R^{21}$ and $R^{22}$ can be each independently selected from methyl, ethyl, n-propyl, isopropyl, or n-butyl; preferably $R^{11}$, $R^{12}$, $R^{21}$ and $R^{22}$ are each independently selected from methyl, ethyl, or isopropyl; preferably $R^{11}$, $R^{12}$, $R^{21}$ and $R^{22}$ are each independently selected from methyl, or ethyl, more preferably ethyl; and $R^{13}$, $R^{14}$, $R^{23}$ and $R^{24}$ are each hydrogen.

Preferably, $X^1$ can be selected from the group comprising 1,4-butylene, 1,6-hexylene, 2,2,4-trimethyl-1,6-hexylene, 2,4,4-trimethyl-1,6-hexylene, 3,3,5-trimethyl-5-methylene-1-cyclohexyl, 4,4'-dicyclohexylene methane, 3,3'-dimethyl-4,4'-dicyclohexylene methane, and 2-methyl-1,5-pentylene, preferably wherein $X^1$ is selected from the group comprising 2-methyl-1,5-pentylene, 4,4'-dicyclohexylene methane, or 3,3'-dimethyl-4,4'-dicyclohexylene methane and $R^{11}$, $R^{12}$, $R^{21}$ and $R^{22}$ are each independently ethyl; and $R^{13}$, $R^{14}$, $R^{23}$ and $R^{24}$ are each hydrogen.

Non-limiting examples of suitable polyaspartic acids or ester thereof can be selected from N,N'-(2-methyl-1,5-pentanediyl)bis-aspartic acid 1,1',4,4'-tetraethyl ester; N,N'-(dicyclohexylmethane-4,4'-diyl)-bis-aspartic acid tetraethyl ester, and N,N'-(3,3-dimethyldicyclohexylmethane-4,4'-diyl)-bis-aspartic acid tetraethyl ester, which are available from Bayer MaterialScience AG, Leverkusen, DE, under the tradename Desmophen NH 1220 (CAS nr: 168253-59-6), Desmophen NH 1420 (CAS nr: 136210-30-5), and Desmophen NH 1520 (CAS nr: 136210-32-7) respectively.

In an embodiment of the current invention, the coating composition comprises from 0.001 wt % to 25 wt %, preferably from 0.010 wt % to 20 wt %, preferably from 0.1 wt % to 15 wt %, preferably from 1 wt % to 10 wt %, preferably from 1 wt % to 8 wt %, preferably from 1 wt % to 6 wt %, of the at least one compound of formula (I), with weight percentage being based on the total weight of the composition.

In an embodiment, the at least one amine or imine component is an amine component selected from (meth)acrylate/aspartate amines which comprises the reaction product of:
a) a polyamine;
b) a dialkyl maleate and/or dialkyl fumarate; and
c) a (meth)acrylate.

Non-limiting examples of such a (meth)acrylate/aspartate amine can be found in WO2008/076714, which is hereby fully incorporated by reference thereto.

In some embodiments, the at least one amine component can be a (meth)acrylate/aspartate amine as described herein above, wherein suitable dialkyl maleate and/or dialkyl fumarate include but are not limited to esters of maleic acid and fumaric acid with monoalcohols such as dimethyl, diethyl, di-n-propyl, di-isopropyl, di-n-butyl, di-sec-butyl, di-tert-butyl, di-isobutyl, di-pentyl, di-t-amyl, di-hexyl, cyclohexyl and di-2-ethylhexyl maleates or the corresponding fumarates. In certain embodiments, dialkyl maleates or dialkyl fumarates with two different alkyl groups, and/or mixtures of dialkyl maleates and dialkyl fumarates can be used. The alkyl groups of dialkyl maleate and/or dialkyl fumarate may comprise additional functional groups such as hydroxyl groups, such as the reaction product of maleic anhydride, an alcohol, and an epoxy, the reaction product of maleic acid or fumaric acid with an alcohol and an epoxy, or the reaction product of maleic acid or fumaric acid with an epoxy. Suitable alcohols include but are not limited to methanol, ethanol, propanol, isopropanol, butanol, isobutanol, sec-butanol, tert-butanol, various isomeric pentanols, various isomeric hexanols, cyclohexanol, 2-ethylhexanol, and the like. Suitable epoxies include but are not limited to ethylene oxide, propylene oxide, 1,2-epoxybutane, and glycidyl neodecanoate (an example of which is CARDURA E10P, Hexion Specialty Chemicals, Inc.). In some embodiments, the dialkyl maleate and/or dialkyl fumarate can be selected from diethyl maleate or dibutyl maleate.

In some embodiments, the at least one amine component can be a (meth)acrylate/aspartate amine as described above, wherein the (meth)acrylate can be any suitable mono or poly (meth)acrylate. In certain embodiments, the polyacrylate comprises di(meth)acrylate, in certain embodiments the polyacrylate comprises tri(meth)acrylate, and in certain embodiments the polyacrylate comprises tetra(meth)acrylate. Non-limiting examples of mono (meth)acrylates include methyl (meth)acrylate, ethyl (meth)acrylate, propyl (meth)acrylate, butyl (meth)acrylate, isobutyl (meth)acrylate, sec-butyl (meth)acrylate, tert-butyl (meth)acrylate, cyclohexyl (meth)acrylate, 2-ethylhexyl (meth)acrylate, isooctyl (meth)acrylate, isodecyl (meth)acrylate, lauryl (meth)acrylate, stearyl (meth)acrylate, isobornyl (meth)acrylate, hydroxyethyl (meth)acrylate, hydroxypropyl (meth)acrylate, 2-hydroxybutyl (meth)acrylate, 4-hydroxybutyl (meth)acrylate, and adducts of hydroxy (meth)acrylates with lactones such as the adducts of hydroxyethyl (meth)acrylate with ε-caprolactone. Suitable diacrylates include but are not limited to ethylene glycol di(meth)acrylate, 1,3-butylene glycol di(meth)acrylate, 1,4-butanediol di(meth)acrylate, 1,6-hexanediol di(meth)acrylate, propylene glycol di(meth)acrylate, dipropylene glycol di(meth)acrylate, tripropylene glycol di(meth)acrylate, tetraethylene glycol di(meth)acrylate, tetrapropylene glycol di(meth)acrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, polyethylene glycol di(meth)acrylate, polybutadiene di(meth)acrylate, thiodiethyleneglycol di(meth)acrylate, trimethylene glycol di(meth)acrylate, triethylene glycol di(meth)acrylate, alkoxylated hexanediol di(meth)acrylate, alkoxylated neopentyl glycol di(meth)acrylate, pentanediol di(meth)acrylate, cyclohexane dimethanol di(meth)acrylate, ethoxylated bisphenol A di(meth)acrylate, and mixtures thereof. Non-limiting examples of tri and higher (meth)acrylates include glycerol tri(meth)acrylate, trimethylolpropane tri(meth)acrylate, ethoxylated trimethylolpropane tri(meth)acrylate, propoxylated trimethylolpropane tri(meth)acrylate, ditrimethylolpropane tetra(meth)acrylate, pentaerythritol tetra(meth)acrylate, ethoxylated pentaerythritol tetra(meth)acrylate, propoxylated pentaerythritol tetra(meth)acrylate, and di pentaerythritol penta(meth)acrylate. Other suitable (meth)acrylate oligomers include (meth)acrylate of epoxidized soya oil, urethane acrylates of polyisocyanates and hydroxyalkyl (meth)acrylates and polyester acrylates. Mixtures of (meth)acrylate monomers may also be used, including mixtures of mono, di, tri, and/or tetra (meth)acrylates. Other suitable poly (meth)acrylates include urethane (meth)acrylates such as those formed from the reaction of a hydroxyl functional (meth)acrylate with a polyisocyanate or with an NCO functional adduct of a polyisocyanate and a polyol or a polyamine. Suitable hydroxyl functional (meth)acrylates include any of those listed herein. In some embodiments, the (meth)acrylate can be selected from the group comprising ethyl acrylate, butyl acrylate, 1,6-hexanediol diacrylate, and methyl methacrylate.

In some embodiments, the at least one amine component can be a (meth)acrylate/aspartate amine obtained as described above, wherein the polyamine can be an amine with at least 2 primary amino groups. In certain embodiments, the polyamine is a diamine. Examples of suitable diamines include but are not limited to ethylene diamine, 1,2-diaminopropane, 1,5-diamino-2-methylpentane (DYTEK A, Invista), 1,3-diaminopentane (DYTEK EP, Invista), 1,2-diaminocyclohexane (DCH-99, Invista), 1,6-diaminohexane, 1,11-diaminoundecane, 1,12-diaminododecane, 3-(cyclohexylamino)propylamine, 1-amino-3,3,5-trimethyl-5-aminomethylcyclohexane, (isophorone diamine ("IPDA")), 4,4'-diaminodicyclohexylmethane (PACM-20, Air Products; DICYKAN, BASF), 3,3'-dimethyl-4,4'-diaminodicyclohexyl methane (DIMETHYL DICYKAN or LAROMIN C260, BASF; ANCAMINE 2049, Air Products), 3,3'-[1,4-butanediylbis-(oxy)bis]-1-propanamine, menthanediamine, and diamino functional polyetherpolyamines having aliphatically bound primary amino groups, examples of which include JEFFAMINE D-230, JEFFAMINE D-400, JEFFAMINE D-2000, and JEFFAMINE D-4000, Huntsman Corporation. In certain embodiments the polyamine is a triamine. Examples of suitable triamines include but are not limited to diethylene triamine, dipropylene triamine, bis (hexamethylene) triamine and triamino functional polyetherpolyamines having aliphatically bound primary amino groups (JEFFAMINE T-403, T-3000, T-5000, Huntsman Corporation). In other embodiments the amine can be a tetra amine or other higher functional amine. Preferably the polyamine can be selected from the group comprising isophorone diamine, 2,2'-dimethyl-4-4'-methylenebiscyclohexylamine, and 4-4'-methylenebiscyclohexylamine. In some embodiments, the polyamine can comprise a polyether diamine.

In some embodiments, the at least one amine component is a (meth)acrylate/aspartate amine as described above, wherein the polyamine comprises a polyether diamine.

In a preferred embodiment, the at least one amine component can be a (meth)acrylate/aspartate amine as described above, wherein the equivalent ratio of polyamine: dialkyl maleate and/or dialkyl fumarate is between 1:0.1 to 1:0.3 and the equivalent ratio of polyamine:(meth)acrylate is 1:0.9 to 1:0.7.

In another embodiment, the at least one amine or imine component is an imine component selected from aldimines or ketimines. Aldimines and ketimines are typically practically not water-soluble.

Preferably, the at least one imine component is a compound of formula (II), preferably the aldimine or ketimine is a compound of formula (II):

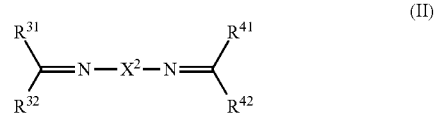

wherein
R$^{31}$ and R$^{41}$ are each independently selected from hydrogen or a group selected from C$_{1-6}$alkyl, C$_{6-10}$aryl, or C$_{3-6}$cycloalkyl, each group being optionally substituted with one or more C$_{1-6}$alkyl substituents; preferably R$^{31}$ and R$^{41}$ are each independently selected from hydrogen or C$_{1-6}$alkyl; preferably R$^{31}$ and R$^{41}$ are each independently C$_{1-6}$alkyl, preferably C$_{1-4}$alkyl;

R$^{32}$ and R$^{42}$ are each independently selected from C$_{1-6}$alkyl, C$_{6-10}$aryl, or C$_{3-6}$cycloalkyl, each group being optionally substituted with one or more C$_{1-6}$alkyl substituents; preferably R$^{32}$ and R$^{42}$ are each independently selected from hydrogen or C$_{1-6}$alkyl, preferably R$^{32}$ and R$^{42}$ are each independently selected from hydrogen or C$_{1-4}$alkyl, and X$^2$ is selected from C$_{1-12}$alkylene, C$_{6-10}$arylene, C$_{3-6}$cycloalkylene, C$_{6-10}$aryleneC$_{1-6}$alkylene, C$_{1-12}$alkyleneC$_{3-6}$cycloalkylene, or C$_{3-6}$cycloalkyleneC$_{1-12}$alkyleneC$_{3-6}$cycloalkylene; wherein each of said C$_{1-12}$alkylene, C$_{6-10}$arylene, C$_{3-6}$cycloalkylene, C$_{6-10}$aryleneC$_{1-6}$alkylene, C$_{1-12}$alkyleneC$_{3-6}$cycloalkylene, or C$_{3-6}$cycloalkyleneC$_{1-12}$alkyleneC$_{3-6}$cycloalkylene optionally includes one or more heteroatoms selected from O, N, S and Si, and wherein each of said C$_{1-6}$alkylene, C$_{6-10}$arylene, C$_{3-6}$cycloalkylene, C$_{6-10}$aryleneC$_{1-6}$alkylene, C$_{1-12}$alkyleneC$_{3-6}$cycloalkylene, or C$_{3-6}$cycloalkyleneC$_{1-12}$alkyleneC$_{3-6}$cycloalkylene is optionally substituted with one or more C$_{1-6}$alkyl substituents.

Preferably, R$^{31}$ and R$^{41}$ are each independently selected from hydrogen, methyl, ethyl, n-propyl, isopropyl, n-butyl, or isobutyl; preferably R$^{31}$ and R$^{41}$ are each independently selected from hydrogen, methyl, ethyl, n-propyl, or isopropyl, preferably R$^{31}$ and R$^{41}$ are each independently selected from hydrogen, methyl, or ethyl, preferably hydrogen or methyl;

R$^{32}$ and R$^{42}$ are each independently selected from methyl, ethyl, n-propyl, isopropyl, n-butyl or -isobutyl; preferably R$^{32}$ and R$^{42}$ are each independently selected from ethyl, n-propyl, isopropyl, n-butyl or -isobutyl; preferably R$^{32}$ and R$^{42}$ are each independently selected from isopropyl, or -isobutyl; and X$^2$ is selected from the group comprising 1,4-butylene, 1,6-hexylene, 2,2,4-trimethyl-1,6-hexylene, 2,4,4-trimethyl-1,6-hexylene, 1-5-cyclohexylene, 5-methylene-1-cyclohexyl, 3,3,5-trimethyl-5-methylene-1-cyclohexyl, 4,4'-dicyclohexylene methane, 3,3'-dimethyl-4,4'-dicyclohexylene methane, and 2-methyl-1,5-pentylene, preferably X$^2$ is selected from the group comprising 2-methyl-1,5-pentylene, 4,4'-dicyclohexylene methane, or 3,3'-dimethyl-4,4'-dicyclohexylene methane; preferably X$^2$ is selected from 1-5-cyclohexylene, 5-methylene-1-cyclohexyl, or 3,3,5-trimethyl-5-methylene-1-cyclohexyl, preferably X$^2$ is 3,3,5-trimethyl-5-methylene-1-cyclohexyl.

Preferably, the at least one imine component is a compound of formula (II), wherein
R$^{31}$ and R$^{41}$ are each independently selected from hydrogen, methyl, ethyl, n-propyl, isopropyl, n-butyl, or isobutyl;
R$^{32}$ and R$^{42}$ are each independently selected from methyl, ethyl, n-propyl, isopropyl, n-butyl or -isobutyl; and
X$^2$ is selected from 1-5-cyclohexylene, 5-methylene-1-cyclohexyl, 3,3,5-trimethyl-5-methylene-1-cyclohexyl.

A non-limiting example of a suitable aldimine is 1,3,3-trimethyl-N-(2-methylpropylidene)-5-[(2-methylpropylidene)amino]-cyclohexanemethanamine, which can be available under the tradename Desmophen VPLS 2142 from Bayer MaterialScience AG, Leverkusen, DE A non-limiting example of a suitable ketimine is N-[[5-(1,3-dimethylbutylideneamino)-1,3,3-trimethyl-cyclohexyl]methyl]-4-methyl-pentan-2-imine, which can be available under the tradename Desmophen VPLS 2965 from Bayer MaterialScience AG, Leverkusen, DE In an embodiment of the current invention, the coating composition comprises from 0.001 wt % to 25 wt %, preferably from 0.010 wt % to 20 wt %, preferably from 0.1 wt % to 15 wt %, preferably from 1 wt % to 10 wt %, preferably from 1 wt % to 8 wt %, preferably from 1 wt % to 6 wt %, of the at least one ketimine or aldimine of formula (II), with weight percentage being based on the total weight of the composition.

According to the first aspect of the invention, the composition comprises at least one isocyanate compound.

Preferably, the at least one isocyanate compound is present in a stoichiometric amount based on the NH— and OH-functionality of the composition. More preferably, the coating composition can comprise between 1 wt % and 50%, preferably between 3 wt % and 25 wt %, preferably between 5 wt % and 15 wt %, more preferably between 6 wt % and 12 wt % of the at least one isocyanate compound, with weight percentage being based on the total weight of the composition. According to a preferred embodiment of the invention, the coating composition comprises at most 12 wt % of the at least one isocyanate, with weight percentage being based on the total weight of the composition.

The at least one isocyanate compound is preferably a polyisocyanate compound. Preferably, the polyisocyanate compound can be selected from the group comprising aliphatic, araliphatic, cycloaliphatic and aromatic polyisocyanates of the type R$^{50}$(—N=C=O)$_p$,
wherein p is at least 2, and R$^{50}$ is an aromatic, aliphatic, cycloaliphatic or combined aromatic/aliphatic group, each group being each independently optionally substituted with one or more C$_{1-6}$alkyl, or —N=C=O substituents,
preferably R$^{50}$ is selected from the group comprising methylene diphenylene, methyl phenylene, 3,3'-dimethyl-4,4'-biphenylene, 4,4'-methylenedicyclohexyl, (methylene)-1,3, 3-trimethyl-cyclohex-5-yl, and hexylene, or groups providing a similar polyisocyanate, each group being each independently optionally substituted with one or more C$_{1-6}$alkyl substituents.

According to an embodiment of the invention, the at least one isocyanate compound is selected from the group comprising: diphenylmethane diisocyanate (MDI), including its 2,4', 2,2' and 4,4' isomers, homopolymers and mixtures thereof, the mixtures of diphenylmethane diisocyanates (MDI) and oligomers thereof, and reaction products of polyisocyanates as set out above with components containing isocyanate-reactive hydrogen atoms forming polymeric polyisocyanates (prepolymers), toluene diisocyanate (TDI), including 2,4 TDI and 2,6 TDI in any suitable isomer mixture thereof, hexamethylene diisocyanate (HMDI or HDI), isophorone diisocyanate (IPDI), butylene diisocyanate, trimethylhexamethylene diisocyanate, di(isocyanatocyclohexyl)methane, including 4,4'-diisocyanatodicyclohexylmethane (H12MDI), isocyanatomethyl-1,8-octane diisocyanate, tetramethylxylene diisocyanate (TMXDI), 1,5-naphtalenediisocyanate (NDI), p-phenylenediisocyanate (PPDI), 1,4-cyclohexanediisocyanate (CD), tolidine diisocyanate (TODI, any suitable mixture of these polyisocyanates, and any suitable mixture of one or more of these polyisocyanates with MDI-type polyisocyanates.

In a preferred embodiment, the polyisocyanate compound is a homopolymer of an isocyanate compound. In a preferred embodiment, the polyisocyanate compound is selected from the list comprising: biurets, uretdiones, isocyanurates, allophanates and iminooxadiazinediones. Suitable isocyanates can include oligomeric polyisocyanates including, but not limited to, dimers, such as the uretdione of 1,6-hexamethylene diisocyanate, trimers, such as the biuret and isocyanurate of 1,6-hexanediisocyanate and the isocyanurate of isophorone diisocyanate, and polymeric oligomers. Modified polyisocyanates can also be used, including, but not limited to, carbodiimides and uretdiones, and mixtures thereof. Examples of suitable polyisocyanates are those containing biuret, isocyanurate and/or iminooxadiazinedione structures. Suitable polyisocyanates containing iminooxadiazinedione groups, and their preparation, can be found in, for example, EP 798 299, EP 896 009, EP 962 454 and EP 962 455, which are herewith fully incorporated hereby by reference. Suitable isocyanates are the aliphatic, aliphatic/cycloaliphatic and/or cycloaliphatic single-type or mixed trimers based on 1,6-diisocyanatohexane and/or isophorone diisocyanate, which are obtainable in accordance, for example, with U.S. Pat. Nos. 4,324,879, 4,288,586, DE 310 026 2, DE 310 026 3, DE 303 386 0 or DE 314 467 2, which are herewith fully incorporated herein by reference. Some of these preferred polyisocyanates are available under the designation DESMODUR® from Bayer MaterialScience of Pittsburgh, Pa. including DESMODUR® N 3200, DESMODUR® N 3300, DESMODUR® N 3400, DESMODUR® XP 2410, and DESMODUR® XP 2580.

Preferably, the at least one isocyanate compound can be selected from isophorone diisocyanate (IPDI), and its homopolymers, preferably its trimers, and hexamethylene diisocyanate (HMDI), and its homopolymers. Preferably, the isocyanate compound is an isocyanurate. An example of such an isocyanate compound is Desmodur Z4470 (3,3',3"-[(1H,3H,5H)-2,4,6-trioxo-1,3,5-triazine-1,3,5-triyltris(methylene)]tris[3,5,5-trimethylcyclohexyl]triisocyanate, CAS nr. 67873-91-0), which is an isocyanurate trimer of isophorone diisocyanate.

In an embodiment of the invention, the coating composition is formulated as a two or a multi-packages coating composition, also referred herein as two-component (2K) or multicomponents coating composition. Preferably the coating composition is formulated as a two packages composition.

A "two packages" or "2K" composition will be understood as referring to a composition wherein two components are maintained separately until just prior to application. A "multi packages" or "multicomponents" composition will be understood as referring to a composition wherein various components are maintained separately until just prior to application. A "1K" or "one package" composition will be understood as referring to a composition wherein all of the components are maintained in the same container after manufacture, during storage, etc.

Preferably the first package (component) can comprises at least one alkyd binder with an oil content of at least 45 wt % and at most 85 wt % or a modified alkyd binder; and at least one amine or imine component selected from the group comprising: polyaspartic acids and esters thereof, (meth)acrylate/aspartate amines, aldimines, ketimines, and combinations thereof; and the second package (component) can comprise at least one isocyanate compound. Preferably the first component can comprises at least one alkyd binder, comprising a medium oil or long or very long oil alkyd or a modified alkyd binder; and at least one amine or imine component selected from the group comprising: polyaspartic acids and esters thereof, (meth)acrylate/aspartate amines, aldimines, ketimines, and combinations thereof; and the second component can comprise at least one isocyanate compound. Preferably, the alkyd binder in the 2K composition comprises a urethane modified alkyd binder.

According to an embodiment of the invention, the coating composition further comprises at least one metal-based drier system.

As used herein, the term "drier" (which is also referred to synonymously as "siccative" when in solution) refers to organometallic compounds that are soluble in organic solvents and binders. They are added to unsaturated oils and binders in order to appreciably reduce their drying times, i.e. the transition of their films to the solid phase. Driers are available either as solids or in solution. Suitable solvents are organic solvents and binders. The driers are present in amounts expressed as weight percent of the metal based on the weight of binder solids (or resin) unless stated otherwise.

Preferably, the drier system comprises a primary drier selected from the group comprising cobalt, vanadium, iron, manganese, cerium, and lead metal soaps and optionally at least one coordination drier selected from the group comprising zirconium, strontium, aluminum, bismuth, lanthanum, and neodymium metal soaps and optionally at least one auxiliary drier selected from the group comprising calcium, barium, potassium and lithium metal soaps. As used herein the term "metal soap" refers to a metal salt of an organic acid.

In a preferred embodiment of the invention, the drier system comprises metal salts of an organic acid, for example a calcium salt, a cobalt salt, a zirconium salt of an organic acid. Preferably the organic acid is a carboxylate. Preferably, the organic acid is selected from branched-chain or straight-chain saturated and unsaturated aliphatic, aromatic and alicyclic monocarboxylic acids having 6 to 22 carbon atoms, cycloaliphatic monocarboxylic acids having 6 to 10 carbon atoms, or mixtures of these acids, preferably the organic acid is selected from the group comprising 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, neononanoic acid, nonanoic acid, isodecanoic acid, neodecanoic acid, 2-ethyldecanoic acid, isotridecanoic acid, isotetradecanoic acid, n-hexanoic acid, n-octanoic acid, n-decanoic acid, n-dodecanoic acid, cyclopentanoic acid, methylcyclopentanoic acid, cyclohexanoic acid, methylcyclohexanoic acid, 1,2-dimethylcyclohexanoic acid, cycloheptanoic acid, myristic acid, stearic acid, arachidic acid, behenic acid, oleic acid, linoleic acid, tall oil fatty acid, erucic acid, p-tert-butylbenzoic acid, monobutyl maleate, monodecyl phthalate, naphthenic acid and mixtures thereof. Particularly preferred acids include 2-ethylhexanoic acid, isononanoic acid, isodecanoic acid, decanoic acid, naphthenic acid and mixtures thereof.

Examples of suitable cobalt (Co) salts of an organic acid include, but are not limited to: cobalt carboxylates such as cobalt neodecanoates, cobalt isononate, cobalt tallates, cobalt linoleates, cobalt octoates, cobalt naphthenates, and cobalt boroacylates. Such cobalt (Co) driers are available from the OM Group, Inc., and include cobalt Ten-Cem®, cobalt Cem-All®, cobalt Hex-Cem®, cobalt Nap-All, Cobalt Lin-All®, and Ultra-Dri® 360D.

Examples of suitable vanadium salt of an organic acid include, but are not limited to, vanadium carboxylates such as vanadium neodecanoate, vanadium octoate, vanadium naphthenate; such as Cur-Rx E® (from the OM Group, Inc. CAS nr: 60451-07-2); drier Cur-Rx® (from the OM Group, Inc.); Borchers VP 0132; Dura DriCAT 3 (CAS nr: 68553-60-6); or Shepherd Vanadium 3% (CAS nr: 68553-60-6).

Examples of suitable calcium (Ca) salts of an organic acid include, but are not limited to: calcium carboxylates such as calcium neodecanoates, calcium octoates, calcium tallates, calcium linoleates, and calcium naphthenates. Such calcium (Ca) driers are available from the OM Group, Inc., and include calcium Ten-Cem®, calcium Cem-All®, calcium Hex-Cem®, and calcium Nap-All.

Examples of suitable zirconium (Zr) salts of an organic acid include, but are not limited to: zirconium carboxylates such as zirconium propionate, zirconium neodecanoates, zirconium octoates, and zirconium naphthenates and mixtures thereof. Such zirconium (Zr) driers are available from the OM Group, Inc., and include zirconium Hex-Cem®.

In a preferred embodiment of the invention, the coating composition comprises from 0 to 2 wt % metal, based on binder solids, preferably from 0.001 wt % to 2 wt % metal, based on binder solids, of at least one metal salt of an organic acid. In an even more preferred embodiment of the invention, the coating composition comprises from 0.002 wt % to 1 wt % metal, based on binder solids, of said at least one metal salt of an organic acid.

According to an embodiment of the invention, the coating composition is a solvent-borne composition.

As used herein, the term "solvent-borne coating composition" refers to a composition that utilizes one or more volatile organic materials as the primary dispersing medium. According to certain embodiments, the coating compositions of the present invention can be substantially free of water, or, in some cases, completely free of water.

As used herein, the term "volatile organic material" refers to any organic compound having an initial boiling point less than or equal to 250° C. measured at a standard pressure of 101.3 kPa.

As used herein, the term "organic compound" refers to any compound containing at least the element carbon and one or more of hydrogen, oxygen, sulfur, phosphorus, silicon, nitrogen, or a halogen, with the exception of carbon oxides and inorganic carbonates and bicarbonates.

Volatile organic materials are often included in coating compositions to reduce the viscosity of the composition sufficiently to enable forces available in simple coating techniques, such as spraying, to spread the coating to controllable, desired and uniform thicknesses. Also, volatile organic materials may assist in substrate wetting, resinous component compatibility, package stability and film formation. Non-limiting examples of suitable volatile organic materials (also referred as solvent) for use in the present composition include aliphatic, cycloaliphatic, aromatic hydrocarbons and oxygenated solvents, such as hexane, heptane, octane, isooctane, cyclohexane, cycloheptane, toluene and xylene; isoparafins; ketones, such as methyl ethyl ketone and methyl isobutyl ketone; alcohols, such as isopropyl alcohol, normal-butyl alcohol and normal-propyl alcohol; monoethers of glycols, such as the monoethers of ethylene glycol and diethylene glycol; monoether glycol acetates, such as 2-ethoxyethyl acetate; as well as compatible mixtures thereof. As examples of such solvents may be mentioned hydrocarbon solvents available under the trademarks Shellsol H, Shellsol K, Shellsol D40, Shellsol D60, Shellsol D70, and Shellsol AB, all from Shell Chemicals, the Netherlands, the trademarked Solvesso 150 solvent from Esso and also: Exxsol D40, Exxsol D60 and Exxsol D80, and solvents such as glycol acetate, butyl glycol acetate, butyl diglycol acetate, methoxypropylene glycol acetate, dipropyleneglycol dimethyl ether, dipropylene glycol methyl ether acetate, propylene glycol dimethyl ether, and propylene carbonate.

As used herein, the term "substantially free" means that the material being discussed is present in the composition, if at all, as an incidental impurity. In other words, the material does not affect the properties of the composition. As used herein, the term "completely free" means that the material being discussed is not present in the composition at all.

In a preferred embodiment, the coating composition further comprises at least one solvent in an amounts of about 0.1 wt % to about 50 wt %, preferably of about 1 wt % to about 25 wt %, preferably of about 2 wt % to about 20 wt %, based on the total weight of the coating composition, preferably of about 2 wt % to about 10 wt %, based on the total weight of the coating composition, preferably of about 2 wt % to about 5 wt %, based on the total weight of the coating composition.

In certain embodiments, the coating composition of the present invention further comprises anti-skinning agents and anti-oxidants such as but not limited to methyl ethyl ketoxime, n-butyl ketoxime, cyclohexane ketoxime, methyl isobutyl ketoxime, di-methyl ketoxime, 2-cyclohexylphenol, 4-cyclohexylphenol, mono-tertiary butylhydroquinone, diethyl hydroxylamine, 2-[(1-methylpropyl)amino]ethanol, 3-methoxybutyl acetate, triphenyl phosphite, tocopherol, hydroxy acetone, tin octoate, isoascorbic acid, and 2,4-pentadione and the like, and mixture thereof.

In certain embodiments, the coating compositions of the present invention comprise at least one colorant. The colorant component of the coating composition may comprise one or more inorganic or organic, transparent or non-transparent pigments. Non-limiting examples of such pigments are titanium dioxide, iron oxides, mixed metal oxides, bismuth vanadate, chromium oxide green, ultramarine blue, carbon black, lampblack, monoazo and disazo pigments, anthraquinones, isoindolinones, isoindolines, quinophthalones, phthalocyanine blues and greens, dioxazines, quinacridones and diketo-pyrrolopyrroles; and extender pigments including ground and crystalline silica, barium sulfate, magnesium silicate, calcium silicate, mica, micaceous iron oxide, calcium carbonate, zinc oxide, aluminum hydroxide, aluminum silicate and aluminum silicate, gypsum, feldspar, talcum, kaolin, and the like. The amount of pigment that is used to form the coating composition is understood to vary, depending on the particular composition application, and can be zero when a clear composition is desired.

For example, a coating composition may comprise up to about 300 wt %, for example about 50 to about 200 wt % of pigment based on the solids content of the alkyd resin (pigment/binder), preferably up to 100 wt % of pigment based on the solids content of the alkyd resin. Depending on the particular end use, a preferred composition may comprise approximately 0 to 100 wt % of pigment based on the solids content of the alkyd resin.

The coating compositions of the present invention may include other additives, e.g. catalysts, other pigments and pigment pastes, dyes, fillers, stabilizers, wetting agents, thixotropic agents, anti-sagging agents, anti-oxidants, anti-fouling agents, bactericides, fungicides, algaecides, anti-settling agents, insecticides, antifoaming agents, slip agents, flow and leveling agents, rheological modifiers, photo-initiators, UV-absorbers, HALS-radical scavengers, corrosion inhibitors, matting agents, waxes, mineral oils, flame retardants, anti-static agents, loss of dry inhibitors, optical brighteners, adhesion promoters, diluents, elastomers, plasticizers, air release agents, absorbents, anti-crater additives, reinforcing agents, dispersing aids, plasticizers, substrate wetting agents, odorants, electroconductive additives, corrosion inhibitors and corrosion-inhibitive pigments, additional hardeners and additional curable compounds, depending on the application. Certain embodiments of the coating compositions of the present invention include surface active agents, such as any of the well known anionic, cationic or nonionic surfactants or dispersing agents. Examples of suitable additives that may be added to the coating composition may be found in Additives Guide, Paint & Coatings Magazine, May 2006, hereby incorporated by reference. If desired, other resinous materials can be utilized in conjunction with the aforementioned alkyd resins.

Metal driers, colorants, pigments, extenders or optionally other additives may be formulated into the coating compositions by mixing and, if appropriate, dispersing and grinding with the liquid binder.

In certain embodiments of the invention, the coating composition of the present invention further comprises at least one complexing agent or neutral ligand as a drying accelerator. Suitable complexing agents include but are not limited to 2,2-bipyridyl, imidazoles, pyrazoles, aliphatic and aromatic amines, 1,10-phenanthroline, 5-methyl-1,10-phenanthroline, and the like.

In a preferred embodiment of the invention, the coating composition further comprises an additive selected from the list comprising: a metal drier, an anti-skinning agent, a pigment dispersant, a defoamer, polymethylalkylsiloxane, and a hindered amine light stabilizer.

In an embodiment, the coating compositions have a VOC content below 400 g/L preferably below 300 g/L, more preferably below 225 g/l, and preferably below 200 g/l.

The coating composition according to the invention can be used in and/or formulated as a varnish, lacquer, paint, stain, enamel, printing ink or floor covering and similar compositions which contain autoxidizable alkyd binders. Preferably, the coating composition is used in and/or formulated as a two-component (2K) system. The coating according to the invention may be cured at room or ambient temperature and may be especially useful in refinish paint compositions. The coating may also be baked to cure.

The coating compositions of the present invention can be applied to various substrates including wood, paper, foam, and synthetic materials (such as plastics including elastomeric substrates), leather, textiles, glass, ceramic, metals (such as iron, steel and aluminum), concrete, cement, brick, and the like.

The present invention also encompasses substrates at least partially coated with at least one coating composition of the present invention. The substrates may be pretreated before application of the at least one coating composition. The substrates may be post-treated after application of the at least one coating composition, with any other compositions.

Any known method can be used to apply the coating compositions of the invention to a substrate. Non-limiting examples of such application methods are spreading (e.g., with paint pad or doctor blade, or by brushing or rolling), spraying (e.g., air-fed spray, airless spray, hot spray, and electrostatic spray), flow coating (e.g., dipping, curtain coating, roller coating, and reverse roller coating), and electrodeposition. (See generally, R. Lambourne, Editor, Paint and Surface Coating: Theory and Practice, Eilis Horwood, 1987, page 39 et seq.).

Two-component systems can be applied using for example two piston pumps, one for the first component and one for the second component, or using sensors and valves with a tuned control circuit, which in turn feed the two paint components by means of feed pumps or pressure tanks. Regardless of which method is used, the components can be conveyed to a static mixing tube. The mixed material can be fed to a spray gun for example through a hose and atomized at the nozzle.

The coating compositions of the present invention can be applied and fully cured at ambient temperature conditions in the range of from about −10° C. to 50° C. Curing of said polymer composition according to the invention typically can proceed very rapidly, and in general can take place at a temperature within the range of from −10° C. to +50° C., in particular from 0° C. to 40° C., more in particular from 3 to 25° C. However, compositions of the present invention may be cured by additional heating.

The coating compositions of the present invention may be used as a single coating, a top coating, a base coating in a two-layered system, or one or more layers of a multi-layered system including a clear top coating composition, colorant layer and base coating composition, or as a primer layer. A typical opaque system may comprise: 1 or 2 layers primer and 1 or 2 layers of top coat (a total of 3 layers). Alternative opaque system may comprise: 1 primer layer, 1 layer of mid coat and 1 layer top coat. Example of transparent systems may comprise 1 layer of impregnant and 3 layers of top coats or 3 layers of top coat for maintenance work.

The invention will be more readily understood by reference to the following examples, which are included merely for purpose of illustration of certain aspects and embodiments of the present invention and are not intended to limit the invention.

EXAMPLES

The examples described hereunder illustrate the effect of the compositions according to embodiments of the present invention on the drying.

Unless otherwise indicated, all parts and all percentages in the following examples, as well as throughout the specification, are parts by weight or percentages by weight respectively.

The following test methods were used to evaluate the films and coatings prepared according to the invention.

The drying stages of the paint formulations were assessed using a BK-drying recorder (Sheen Instruments Ltd). A wet paint layer was cast on a glass strip 30.5×2.5 cm by using a sheen cube with a gap size of 150 μm. A vertical blunt needle was positioned into the freshly applied film loaded by 5 g of brass and then dragged through the drying paint at a speed of 12.2 mm/h in a direction parallel to the length of the coat. A freshly applied alkyd coating was a viscous liquid and the needle penetrated through the coating onto the glass plate and created a score. As the physical drying and autoxidation of the alkyd coating progressed the viscosity of the drying film rose and the resistance to penetration by the needle increased. During the drying process, the needle created a typical pattern and the various drying stages could be read off from the scribed pattern.

The drying times can be determined in terms of four stages, defined as follows:

Run back: the film flows back together when the stylus moves through it and no groove is formed. This phase is characterized by the evaporation of the solvent from the paint.

Continuous track: the film is starting to set up. It does not flow back together after the stylus moves through it bringing about a groove in the film. In this stage, the viscosity of the pain film has substantially increased. This phase ends when the point of "start of gel tear" is reached.

Gel tear: The stylus rips the surface skin of the film. The film is starting to surface dry but is not through dry.

Surface trace: The stylus leaves a mark on the surface of the film. The phase is characterized by that the film is starting to through dry. At the end of this phase, the resistance becomes total and no further penetration occurs. The alkyd film has reached the status of "through dry".

Drying times can also be assessed as follows. The test composition was cast on a glass plate by using a draw bar with a gap size of 150 μm.

Dust-free: The coating is considered dust-free if it does not pull fibers when a wad of cotton is blown gently of a drying film in a horizontal direction.

Tack-free: The coating is considered tack free if it does not pull fibers when a wad of cotton is placed on the drying film with a load of 1 kg/3 cm² for 10 seconds and afterwards blown gently away in a horizontal direction.

Through-dry: The coating is considered through dry if it is not affected pressing and twisting by the thumb with a load of 7 kg on the surface of the film.

The color reading of the cured coating compositions on Leneta Charts was measured using a Datacolor 400 dual beam spectrophotometer against the standard white background.

The gloss level of a paint film was measured after 24 hours of drying with a Dr. Lange Refo 3 reflectometer in accordance with ISO 2813.

The Erichsen cupping test according to ISO 1520 is the assessment of the resistance of paint films against cracking and/or detachment from a metal substrate when subjected to gradual deformation by indentation under standard conditions. For elasticity measurements, the paints were applied on cold rolled steel with a 150 μm slit applicator. After drying for 1 day at room temperature, these panels were placed in an oven at 100° C. for 5 hours. The elasticity of the paint film was assessed using the Erichsen cupping test according to ISO 1520. Using a mechanically driven indenter and a lens, the depth of indentation at which the coating starts to crack was determined.

Mechanical film properties, i.e. tensile strength, percent elongation at break, and Young's modulus were characterized using an Instron 3366 tensile strength tester according to EN ISO 527-1. Free coating films of 100 μm thickness released from the substrate were placed in an oven at 100° C. for 5 hours and subsequently conditioned for seven days at room temperature before placing in the grips of the tensile strength tester.

The following reactants were used in the examples to evaluate the films and coatings prepared according to the invention:

Desmophen NH 1220: N,N'-(2-methyl-1,5-pentanediyl)bis-aspartic acid 1,1',4,4'-tetraethyl ester, Bayer MaterialScience AG, Leverkusen, DE, which corresponds to compound of formula (I), wherein $R^{11}$, $R^{12}$, $R^{21}$ and $R^{22}$ are each ethyl; $R^{13}$, $R^{14}$, $R^{23}$ and $R^{24}$ are each hydrogen; and $X^1$ is 2-methyl-1,5-pentylene, ($X^1$=group of formula (XI)):

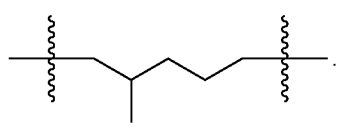

(XI)

Desmophen NH 1420: N,N'-(dicyclohexylmethane-4,4'-diyl)-bis-aspartic acid tetraethyl ester, Bayer MaterialScience AG, Leverkusen, DE, which corresponds to compound of formula (I), wherein $R^{11}$, $R^{12}$, $R^{21}$ and $R^{22}$ are each ethyl; $R^{13}$, $R^{14}$, $R^{23}$ and $R^{24}$ are each hydrogen; and $X^1$ is 4,4'-dicyclohexylene methane ($X^1$=group of formula (XII)):

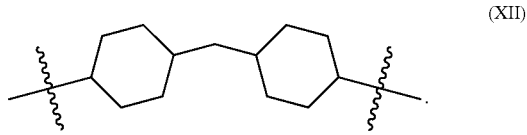 [SMILES: *C1CCC(CC2CCC(*)CC2)CC1]

(XII)

Desmophen NH 1520: N,N'-(3,3-dimethyldicyclohexyl-methane-4,4'-diyl)-bis-aspartic acid tetraethyl ester, Bayer MaterialScience AG, Leverkusen, DE, which corresponds to compound of formula (I), wherein $R^{11}$, $R^{12}$, $R^{21}$ and $R^{22}$ are each ethyl; $R^{13}$, $R^{14}$, $R^{23}$ and $R^{24}$ are each hydrogen; and $X^1$ is 3,3'-dimethyl-4,4'-dicyclohexylene methane ($X^1$=group of formula (XIII)):

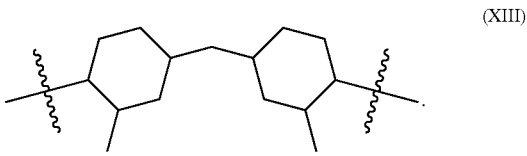 [SMILES: *C1CCC(CC2CCC(*)C(C)C2)CC1C]

(XIII)

Desmophen VPLS 2142: 1,3,3-trimethyl-N-(2-methylpropylidene)-5-[(2-methylpropylidene)amino]-cyclohexanemethanamine, Bayer MaterialScience AG, Leverkusen, DE, which corresponds to compound of formula (XIV).

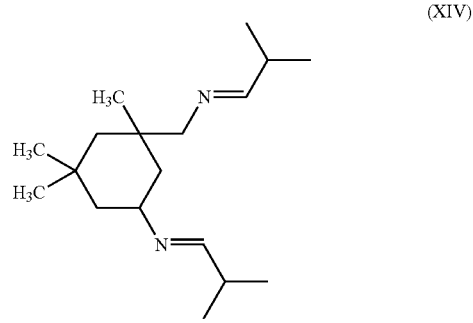 [SMILES: CC(C)/C=N/CC1(C)CC(/N=C/C(C)C)CC(C)(C)C1]

(XIV)

Desmodur Z 4470 BA: isophorone diisocyanate homopolymer in a solution of 70%, dissolved in n-butylacetate, Bayer MaterialScience AG, Leverkusen, DE, which corresponds to compound of formula (XV)

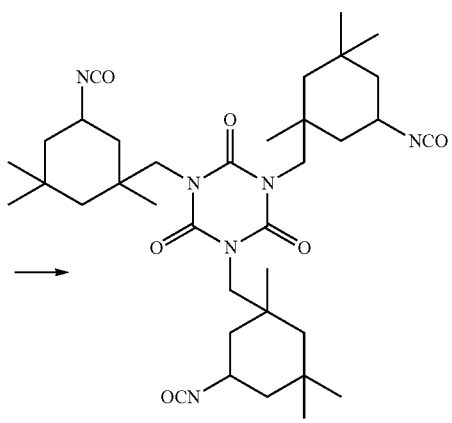

(XV)

Desmodur N 3600: hexamethylene-1,6-diisocyanate homopolymer, Bayer MaterialScience AG, Leverkusen, DE (solids content 100%)

Albodur 901 VP: Castor oil based polyol, Alberdingk Boley GmbH, Krefeld, DE

Albodur 912 VP: Castor oil based polyol, Alberdingk Boley GmbH, Krefeld, DE

Synolac 5085: solvent free low viscosity linear saturated hydroxyl modified polyester resin, Cray Valley S.R.L., Gissi, IT The urethane modified alkyds used were mixtures of long oil unmodified alkyds and urethane-modified alkyds.

The coating compositions of examples 1 and 2 were prepared by grinding in a bead mill and mixing according to the formulations given in Table 1. The coating composition of comparative example 3 was a typical white gloss enamel and the coating composition of comparative example 4 was a white formulation based on polyaspartics and an aldimine. The dry times were assessed.

TABLE 1

| coating composition and test results (quantities given in parts per weight) | | | | |
|---|---|---|---|---|
| | example | | comparative example | |
| | 1 | 2 | 3 | 4 |
| component A | | | | |
| urethane modified alkyd (65% nvm) | 58.0 | 56.4 | 59.5 | |
| hydrocarbon resin (70% nvm) | 6.6 | 6.4 | 6.8 | |
| anti-skinning agent | 0.4 | 0.4 | 0.4 | |
| pigment dispersant | 0.8 | 0.8 | 0.8 | 1.4 |
| titanium dioxide | 24.5 | 24.0 | 25.1 | 40.0 |
| calcium (5%) drier | 2.7 | 2.7 | 2.8 | |
| zirconium (18%) drier | 0.9 | 0.9 | 0.9 | |
| cobalt (10%) drier | 0.1 | 0.1 | 0.1 | |
| HALS | 0.5 | 0.5 | 0.5 | |
| defoamer | 0.2 | 0.2 | 0.2 | |
| polymethylalkylsiloxane | 0.1 | 0.1 | 0.1 | |
| high boiling aliphatic hydrocarbon solvent | 2.7 | 2.5 | 2.7 | |
| Desmophen NH 1220 | 2.5 | | | |
| Desmophen NH 1420 | | 5.0 | | 18.6 |
| Desmophen NH 1520 | | | | 20.0 |
| Desmophen VP LS 2142 | | | | 20.0 |

TABLE 1-continued

| coating composition and test results (quantities given in parts per weight) | | | | |
|---|---|---|---|---|
| | example | | comparative example | |
| | 1 | 2 | 3 | 4 |
| component B | | | | |
| Desmodur Z 4470 BA | 13.2 | 15.5 | | |
| Desmodur N 3600 | | | | 51.0 |
| drying times (hours:minutes) at 23° C./50% RH | | | | |
| dust-free | 0:30 | 0:35 | 2:30 | 0:30 |
| tack-free | 1:00 | 1:15 | 3:15 | 3:00 |
| through-dry | 4:00 | 4:00 | 5:00 | 4:00 |
| drying times (hours:minutes) at 5° C./80% RH | | | | |
| dust-free | 1:00 | 1:15 | 6:30 | 0:30 |
| tack-free | 2:00 | 2:30 | 7:00 | 2:30 |
| through-dry | 4:30 | 4:30 | 8:30 | 4:00 |

The drying of the compositions of examples 1 and 2, which were alkyd formulations containing small amounts (2.5-5%) of a polyaspartic were comparable or even faster than the curing of the composition of comparative example 4 which was a composition completely based on polyaspartic and aldimine technologies. The addition of polyaspartics and isocyanates as in compositions of examples 1 and 2 improved substantially the drying speed of a typical 1K alkyd formulation as of comparative example 3.

The coating compositions of example 5 and the of the comparative examples 6 and 7 were prepared by grinding in a bead mill and mixing according to the formulations given in Table 2.

TABLE 2

| coating composition and test results (quantities given in parts per weight) | | | |
|---|---|---|---|
| | example | comparative example | |
| | 5 | 6 | 7 |
| component A | | | |
| urethane modified alkyd (65% nvm) | 61.1 | 64.3 | 64.3 |
| anti-skinning agent | 0.4 | 0.4 | 0.4 |
| pigment dispersant | 0.7 | 0.8 | 0.8 |
| titanium dioxide | 23.9 | 25.2 | 25.2 |
| calcium (5%) drier | 2.9 | 3.1 | 3.1 |
| zirconium (18%) drier | 1.0 | 1.0 | 1.0 |
| cobalt (10%) drier | 0.1 | 0.2 | 0.2 |
| defoamer | 0.2 | 0.2 | 0.2 |
| polymethylalkylsiloxane | 0.1 | 0.1 | 0.1 |
| HALS | 0.4 | 0.4 | 0.4 |
| high boiling aliphatic hydrocarbon solvent | 4.2 | 4.4 | 4.4 |
| Desmophen NH 1220 | 5.0 | | |
| component B | | | |
| Desmodur Z 4470 BA | 17.6 | 10.4 | |
| drying times (hours:minutes) at 23° C./50% RH | | | |
| run back | 0:30 | 1:15 | 1:30 |
| start of gel tear | 1:45 | 3:15 | 3:45 |
| end of gel tear | 1:45 | 5:00 | 7:00 |
| end of surface trace | 7:45 | 9:00 | 15:15 |

TABLE 2-continued coating composition and test results
(quantities given in parts per weight)

|  | example | comparative example | |
| --- | --- | --- | --- |
|  | 5 | 6 | 7 |
| drying times (hours:minutes) at 5° C./80% RH | | | |
| run back | 0:30 | 0:45 | 1:00 |
| start of gel tear | 1:45 | 2:15 | 6:00 |
| end of gel tear | 2:15 | 5:15 | 10:30 |
| end of surface trace | 8:30 | 11:15 | 17:30 |

The data in Table 2 showed that the addition of isocyanate to an alkyd formulation enhanced the drying performances when compared to the comparative examples 6 and 7, and that the combination of low amounts of polyaspartics and isocyanates further improved substantially the drying of the composition.

The coating compositions of example 8 and of the comparative examples 9, 10, 11 and 12 were prepared by grinding in a bead mill and mixing according to the formulations given in Table 3.

TABLE 3 coating composition and test results
(quantities given in parts per weight)

|  | example | comparative example | | | |
| --- | --- | --- | --- | --- | --- |
|  | 8 | 9 | 10 | 11 | 12 |
| component A | | | | | |
| urethane modified alkyd binder (77% nvm) | 60.3 | 60.2 | 60.2 | 60.2 | 61.7 |
| anti-skinning agent | 0.4 | 0.4 | 0.4 | 0.4 | 0.4 |
| pigment dispersant | 0.7 | 0.7 | 0.7 | 0.7 | 0.8 |
| titanium dioxide | 24.1 | 24.1 | 24.1 | 24.1 | 24.7 |
| calcium (5%) drier | 3.9 | 3.9 | 3.9 | 3.9 | 4.0 |
| zirconium (18%) drier | 2.0 | 2.0 | 2.0 | 2.0 | 2.1 |
| cobalt (10%) drier | 0.2 | 0.2 | 0.2 | 0.2 | 0.2 |
| defoamer | 0.2 | 0.2 | 0.2 | 0.2 | 0.2 |
| polymethylalkylsiloxane | 0.1 | 0.1 | 0.1 | 0.1 | 0.1 |
| HALS | 0.4 | 0.4 | 0.4 | 0.4 | 0.4 |
| high boiling aliphatic hydrocarbon solvent | 5.3 | 5.3 | 5.3 | 5.3 | 5.4 |
| Desmophen NH 1420 | 2.4 | | | | |
| Albodur 901 | | 2.5 | | | |
| Albodur 912 | | | 2.5 | | |
| Synolac 5085 | | | | 2.5 | |
| component B | | | | | |
| Desmodur Z 4470 BA | 10.4 | 10.6 | 11.0 | 11.6 | |
| drying times (hours:minutes) at 23° C./50% RH | | | | | |
| run back | 0:30 | 1:00 | 1:00 | 1:00 | 1:15 |
| start of gel tear | 1:15 | 1:15 | 1:15 | 1:15 | 1:30 |
| end of gel tear | 2:00 | 3:30 | 3:45 | 2:15 | 7:15 |
| end of surface trace | 2:00 | 6:00 | 5:45 | 3:45 | 7:15 |
| drying times (hours:minutes) at 5° C./80% RH | | | | | |
| run back | 0:30 | 1:30 | 1:15 | 1:15 | 0:45 |
| start of gel tear | 2:15 | 4:45 | 4:45 | 5:00 | 4:30 |
| end of gel tear | 2:15 | 7:45 | 8:15 | 8:15 | 8:15 |
| end of surface trace | 7:15 | 10:15 | 11:30 | 11:45 | 10:15 |

The composition of example 8 displayed a rapid curing at room temperature but also under adverse conditions. The comparative compositions of examples 9, 10 and 11, containing a polyhydroxyl compound as isocyanate reactive component, exhibited a fast drying at room temperature but the curing speed at 5° C. and 80% relative humidity was equal to that of a 1K long oil alkyd formulation (comparative example 13).

The coating compositions of examples 13, 14 and 15 and of the comparative example 12 were prepared by grinding in a bead mill and mixing according to the formulations given in Table 4.

TABLE 4 coating composition and test results
(quantities given in parts per weight)

|  | example | | | comparative example |
| --- | --- | --- | --- | --- |
|  | 13 | 14 | 15 | 12 |
| component A | | | | |
| urethane modified alkyd binder (77% nvm) | 60.5 | 59.3 | 58.0 | 61.7 |
| anti-skinning agent | 0.4 | 0.4 | 0.4 | 0.4 |
| pigment dispersant | 0.7 | 0.7 | 0.7 | 0.8 |
| titanium dioxide | 24.2 | 23.7 | 23.2 | 24.7 |
| calcium (5%) drier | 3.9 | 3.8 | 3.7 | 4.0 |
| zirconium (18%) drier | 2.0 | 2.0 | 1.9 | 2.1 |
| cobalt (10%) drier | 0.2 | 0.2 | 0.2 | 0.2 |
| defoamer | 0.2 | 0.2 | 0.2 | 0.2 |
| polymethylalkylsiloxane | 0.1 | 0.1 | 0.1 | 0.1 |
| HALS | 0.4 | 0.4 | 0.4 | 0.4 |
| high boiling aliphatic hydrocarbon solvent | 5.3 | 5.2 | 5.1 | 5.4 |
| Desmophen VP LS 2142 | 2.0 | 4.0 | 6.0 | |
| component B | | | | |
| Desmodur Z 4470 BA | 9.9 | 12.1 | 14.2 | |
| drying times (hours:minutes) at 23° C./50% RH | | | | |
| run back | 0:45 | 0:30 | 0:15 | 1:15 |
| start of gel tear | 1:30 | 0:45 | 0:30 | 1:30 |
| end of gel tear | 2:15 | 0:45 | 0:30 | 7:15 |
| end of surface trace | 3:30 | 2:00 | 1:30 | 7:15 |
| drying times (hours:minutes) at 5° C./80% RH | | | | |
| run back | 0:30 | 0:30 | 0:15 | 0:45 |
| start of gel tear | 4:15 | 0:45 | 0:30 | 4:30 |
| end of gel tear | 4:15 | 0:45 | 0:30 | 8:15 |
| end of surface trace | 5:30 | 4:45 | 1:45 | 10:15 |

The results in Table 4 showed that the addition of polyaldimines and isocyanates improved substantially the drying speed of a typical 1K alkyd formulation as of comparative example 12.

The coating compositions of examples 16, 17 and 18 and of the comparative example 12 were prepared by grinding in a bead mill and mixing according to the formulations given in Table 5.

TABLE 5 coating composition and test results
(quantities given in parts per weight)

| | example | | | comparative example |
|---|---|---|---|---|
| | 16 | 17 | 18 | 12 |
| component A | | | | |
| urethane modified alkyd binder (77% nvm) | 59.3 | 58.0 | 56.8 | 61.7 |
| anti-skinning agent | 0.4 | 0.4 | 0.3 | 0.4 |
| pigment dispersant | 0.7 | 0.7 | 0.7 | 0.8 |
| titanium dioxide | 23.7 | 23.2 | 22.7 | 24.7 |
| calcium (5%) drier | 3.8 | 3.7 | 3.7 | 4.0 |
| zirconium (18%) drier | 2.0 | 1.9 | 1.9 | 2.1 |
| cobalt (10%) drier | 0.2 | 0.2 | 0.2 | 0.2 |
| defoamer | 0.2 | 0.2 | 0.2 | 0.2 |
| polymethylalkylsiloxane | 0.1 | 0.1 | 0.1 | 0.1 |
| HALS | 0.4 | 0.4 | 0.3 | 0.4 |
| high boiling aliphatic hydrocarbon solvent | 5.2 | 5.1 | 5.0 | 5.4 |
| Desmophen NH 1420 | 4.0 | 6.0 | 8.0 | |
| component B | | | | |
| Desmodur Z 4470 BA | 9.9 | 11.0 | 12.1 | |
| coating film performance | | | | |
| 20°/60° gloss | 82/92 | 83/94 | 83/95 | 83/91 |
| whiteness | 67.2 | 66.8 | 67.0 | 70.9 |
| Erichsen cupping test [mm] | 8.9 | 8.2 | 7.7 | 9 |
| tensile strenght [[N/mm2]] | 19.1 | 21.1 | 25.1 | 14.7 |
| elongation at break [%] | 2.6 | 2.8 | 3.8 | 7.9 |
| E-modulus [N/mm²] | 1.3 10³ | 1.2 10³ | 1.2 10³ | 0.5 10³ |

The coating compositions of examples 16, 17 and 18 showed that the addition of polyaspartics and polyisocyanates had no detrimental effect op the gloss values, thereby indicating the good compatibility of alkyds and polyaspartics. The tensile strength and Young's modulus were increased showing that the films had become stiffer and the elasticity of the coating was only moderately reduced. The results in Table 5 show that the addition of polyaspartics and polyisocyanates had no negative effect on the aesthetical performance of the coating while the films were more stiff.

It is to be understood that although preferred embodiments and/or materials have been discussed for providing embodiments according to the present invention, various modifications or changes may be made without departing from the scope and spirit of this invention.

The invention claimed is:

1. A coating composition comprising:
   a modified autooxidizable alkyd binder prepared from at least one unsaturated fatty acid or glycerol ester thereof;
   at least one amine or imine component selected from the group comprising:
   polyaspartic acids and esters thereof, (meth)acrylate/aspartate amines, aldimines, ketimines, and combinations thereof; and
   at least one isocyanate compound, present in the coating composition in an amount of 1 to 50 weight percent, based on the total weight of the coating composition.

2. A coating composition according to claim 1, wherein the modified alkyd binder comprises a urethane modified alkyd binder.

3. The coating composition according to claim 1, comprising from 0.001 wt% to 25 wt% of the at least one amine or imine component, with weight percentage being based on the total weight of the composition.

4. The coating composition according to claim 1, wherein the at least one amine or imine component is an amine component selected from polyaspartic acids or esters thereof.

5. The coating composition according to claim 4, wherein the polyaspartic acid or ester thereof is a compound of formula (I):

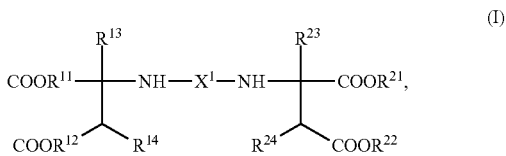

wherein
$X^1$ is a group selected from $C_{2-12}$alkylene, $C_{3-6}$cycloalkylene, $C_{1-12}$alkyleneC$_{3-6}$cycloalkylene, or $C_{3-6}$cycloalkyleneC$_{1-12}$alkyleneC$_{3-6}$cycloalkylene; each group being optionally substituted with one or more $C_{1-6}$alkyl substituents;
$R^{11}$, $R^{12}$, $R^{21}$ and $R^{22}$ are each independently selected from hydrogen or $C_{1-12}$alkyl; and
$R^{13}$, $R^{14}$, $R^{23}$ and $R^{24}$ are each independently selected from hydrogen or $C_{1-12}$alkyl.

6. The coating composition according to claim 1, wherein the at least one amine or imine component is an amine component selected from (meth)acrylate/aspartate amines, which comprises the reaction product of:
   a polyamine;
   a dialkyl maleate and/or dialkyl fumarate; and
   a (meth)acrylate.

7. The coating composition according to claim 1, wherein the at least one amine or imine component is an imine component selected from aldimines or ketimines.

8. The coating composition according to claim 7, wherein the aldimine or ketimine is a compound of formula (II):

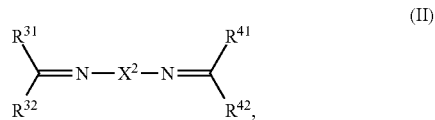

wherein
$R^{31}$ and $R^{41}$ are each independently selected from hydrogen or a group selected from $C_{1-6}$alkyl, $C_{6-10}$aryl, or $C_{3-6}$cycloalkyl, each group being optionally substituted with one or more $C_{1-6}$alkyl substituents;
$R^{32}$ and $R^{42}$ are each independently selected from $C_{1-6}$alkyl, $C_{6-10}$aryl, or $C_{3-6}$cycloalkyl, each group being optionally substituted with one or more $C_{1-6}$alkyl substituents; and
$X^2$ is selected from $C_{1-12}$alkylene, $C_{6-10}$arylene, $C_{3-6}$cycloalkylene, $C_{6-10}$aryleneC$_{1-6}$alkylene, $C_{1-12}$alkyleneC$_{3-6}$cycloalkylene, or $C_{3-6}$cycloalkyleneC$_{1-12}$alkyleneC$_{3-6}$cycloalkylene; wherein each of said $C_{1-12}$alkylene, $C_{6-10}$arylene, $C_{3-6}$cycloalkylene, $C_{6-10}$aryleneC$_{1-6}$alkylene, $C_{1-12}$alkyleneC$_{3-6}$cycloalkylene, or $C_{3-6}$cycloalkyleneC$_{1-12}$alkyleneC$_{3-6}$cycloalkylene optionally includes one or more heteroatoms selected from O, N, S and Si, and wherein each of said $C_{1-6}$alkylene, $C_{6-10}$arylene, $C_{3-6}$cycloalkylene, $C_{6-10}$aryleneC$_{1-6}$alkylene, $C_{1-12}$alkyleneC$_{3-6}$cycloalkylene, or $C_{3-6}$cycloalkylene$C_{1-12}$alkylene$C_{3-6}$cycloalkylene is optionally substituted with one or more $C_{1-6}$alkyl substituents.

9. The coating composition according to claim 1, further comprising at least 48 wt% of an unmodified alkyd binder having an oil content of at least 45 wt% and at most 85 wt%, with weight percentage being based on the total weight of the composition.

10. The coating composition according to claim 1, further comprising at least one metal-based drier system, wherein the drier system comprises a primary drier selected from cobalt, vanadium, iron, manganese, cerium, and lead metal soaps.

11. The coating composition according to claim 1, wherein the coating composition is a solvent-borne composition.

12. The coating composition according to claim 1, wherein the coating composition is a two-component (2K) coating composition.

13. A substrate having applied thereon a coating composition according to claim 1.

14. The coating composition according to claim 10, wherein the drier system further comprises at least one coordination drier selected from zirconium, strontium, aluminum, bismuth, lanthanum, and neodymium metal soaps.

15. The coating composition according to claim 10, wherein the drier system further comprises at least one auxiliary drier selected from calcium, barium, potassium and lithium metal soaps.

* * * * *